(12) United States Patent
Van Berkum et al.

(10) Patent No.: US 10,323,135 B2
(45) Date of Patent: Jun. 18, 2019

(54) REUSABLE CAPTURE COMPLEX

(71) Applicant: Ioniqa Technologies B.V., Eindhoven (NL)

(72) Inventors: Susanne Van Berkum, Eindhoven (NL); Vincent Philippi, Eindhoven (NL); Marcel Vilaplana Artigas, Eindhoven (NL); Rick De Groot, Eindhoven (NL); Tonnis Hooghoudt, Eindhoven (NL)

(73) Assignee: Ioniqa Technologies B.V., Eindhoven (NL)

( * ) Notice: Subject to any disclaimer, the term of this patent is extended or adjusted under 35 U.S.C. 154(b) by 0 days.

(21) Appl. No.: 15/539,494

(22) PCT Filed: Dec. 23, 2015

(86) PCT No.: PCT/NL2015/050905
§ 371 (c)(1),
(2) Date: Jun. 23, 2017

(87) PCT Pub. No.: WO2016/105198
PCT Pub. Date: Jun. 30, 2016

(65) Prior Publication Data
US 2017/0369670 A1    Dec. 28, 2017

(30) Foreign Application Priority Data

Dec. 23, 2014 (NL) .................................... 2014048
Dec. 23, 2014 (NL) .................................... 2014050

(51) Int. Cl.
*C08J 11/04* (2006.01)
*C08J 11/28* (2006.01)
*C08J 11/16* (2006.01)
*C08J 11/24* (2006.01)

(52) U.S. Cl.
CPC ................ *C08J 11/28* (2013.01); *C08J 11/04* (2013.01); *C08J 11/16* (2013.01); *C08J 11/24* (2013.01); *C08J 2367/02* (2013.01); *Y02W 30/705* (2015.05); *Y02W 30/706* (2015.05)

(58) Field of Classification Search
USPC .............................................. 521/41, 50, 48
See application file for complete search history.

(56) References Cited

FOREIGN PATENT DOCUMENTS

WO   WO 2014/142661 A2   9/2014
WO   WO 2014/209117 A1   12/2014

OTHER PUBLICATIONS

International Preliminary Report on Patentability dated Jul. 6, 2017, for International Application No. PCT/NL2015/050905.
Dalaigh, "A Magnetic-Nanoparticle-Supported 4-N.N-Dialkylaminopyridine Catalyst: Excellent Reactivity Combined with Facile Catalyst Reovery and Recyclability", Angew. Chem.
International Search Report and Written Opinion for International Application No. PCT/NL2015/050905 dated Jun. 2, 2016.

*Primary Examiner* — Terressa Boykin
(74) *Attorney, Agent, or Firm* — Cook Alex Ltd.

(57) ABSTRACT

An improved reusable capture complex and a method of capturing an additive releasable from a polymer material are disclosed. The capture complex includes a catalyst entity, a magnetic nanoparticle, and a bridging moiety between the catalyst entity and the magnetic nanoparticle. The method provides a high reduction of free additive of a polymer material.

18 Claims, 2 Drawing Sheets

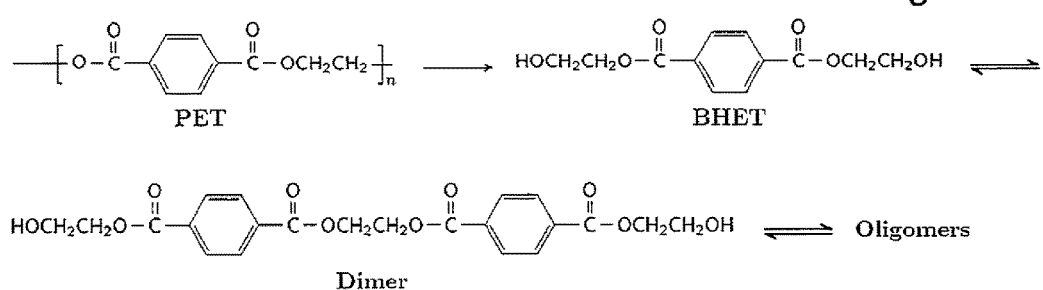
Fig. 1a
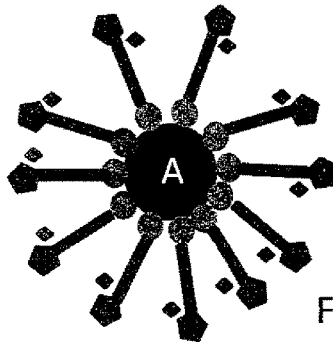
Fig. 1b
Fig. 1c

the present capture complex. It is economically unfa-

REUSABLE CAPTURE COMPLEX

CROSS REFERENCE TO RELATED APPLICATIONS

This is a U.S. National Stage of International Patent Application No. PCT/NL2015/050905 filed Dec. 23, 2015, which claims the benefit of and priority to Netherlands Application No. 2014048, filed Dec. 23, 2014 and Netherlands Application No. 2014050, filed Dec. 23, 2014, all of which are incorporated by reference herein in their entireties.

FIELD OF THE INVENTION

The present invention is in the field of an improved reusable capture complex and a method of releasable capturing an additive present in a polymer material. The present use and method provide a high reduction of free additive.

BACKGROUND OF THE INVENTION

A problem with many chemical processes is interference of contaminants with the process. Therefore these contaminants are preferably removed before the process starts, i.e. it is a goal to start with as pure as possible sources. However, if the contaminants are present in one of the source products to be processed, such as in a polymer material, removal is at least complicated and in certain cases even virtually impossible, such as in the case of additives being present in polymers. Upon degradation of such polymers in the polymer material the additives are released and may interfere with e.g. the degradation process and may cause side reactions to occur. In such cases the additives are preferably removed during the degradation process, and preferably are removed continuously.

An interference of additives considered relates to interference with a catalyst. Typically catalysts, and especially complexes, and function of a catalyst are sensitive to contaminants being present; in other words they function only properly under relative pure and clean conditions. As a result of contamination catalysts need to be replaced regularly, and extreme care is typically taken not to introduce contaminants. That may also be a reason why catalyst are typically not considered for degradation processes, such as of polymers, as these processes almost inherently introduce contaminants, e.g. in the form of additives being present in the polymer material, such as curing agents, plasticizers, property modifiers, stabilizers, surfactants, fillers, colorants, pigments, antioxidants, antistatic, anti-fungi, anti-bactericides, UV-blockers, UV-stabilizers, and lubricants. These additives form a serious obstacle in finding a method for degrading polymers.

It is known to use finely divided materials, such as carbon black and nanoparticles, to remove contaminants from aqueous systems, such as waste water. Such small materials can typically not be used in non-aqueous systems, and typically also are not compatible with polymer degradation processes, e.g. because of interference with the process, because of inadequate mixing properties, and non-dispersibility in solvents typically used.

Therefore there still is a need for adequate removal of contaminants, in particular in polymer degradation processes, which removal does not interfere with the process itself.

The present invention provides an improved method of removing additives from polymer materials and an additive capturer e.g. for degrading polymers which overcomes at least one of the above disadvantages, without jeopardizing functionality and advantages.

SUMMARY OF THE INVENTION

The present invention relates in a first aspect to use of an improved reusable capture complex for releasable capturing an additive present in a polymer material according to claim 1, and in a second aspect to a method according to claim 7, showing partly major improvements over the prior art, e.g. in terms of a very low amount of complex used per amount of additive (0.2-18 wt. % versus 17-80 wt. % [weight catalyst/weight polymer]), insensitivity to contaminants, such as environmental substances, insensitivity to composition of raw material (i.e. type of polymer material to be degraded and type of additive), etc. Put in numbers the present invention provides a reuse of capturer (over 50 times, being absent in prior art degradation processes), allowing any mixture of waste polymers (not known in the prior art, typically well cleaned, well separated, having one type/source of material, is needed for prior art processes), etc.

The present capture complex comprises three distinguishable elements: a nanoparticle, a bridging moiety attached, such as by a covalent bond, to the nanoparticle and a catalyst entity (chemically, such as by a covalent bond) attached to the bridging moiety. The bridging moiety is solely in between the catalyst and the nanoparticle, respectively, e.g. no "coating" or shell is present on the nanoparticle. The present complex is for instance different from a complex having a bridging moiety fully covering a nanoparticle, such as in a core-shell particle. The complex may be an ionic complex.

The additive is typically present in a small amount, such as in amount of <10.000 ppm (based on a total amount polymer). The present capture complex is particularly suited for capturing colored additives, more particularly a dye, a pigment, an ink, a paint, and a coloured chemical.

It is noted that the capture complex is intended to perform various functions, such as catalysis of polymer degradation, capturing of additives, etc. In view of a polymer degradation process the present complex preferably does not disperse well in a water or an aqueous solution, contrary to e.g. nanoparticles per se.

The present nanoparticle is of a magnetic or non-magnetic nature. As such nanoparticles comprising a magnetic material are included, as well as particles that can be magnetized sufficiently under relative modest magnetic fields, such as being applied in the present method. The use of magnetic nanoparticles has the advantage that these may for instance be recovered by magnetic attraction after use. Suitably, the magnetic nanoparticles contain an oxide of iron, manganese and/or cobalt. Iron oxide, for instance but not exclusively in the form of $Fe_3O_4$ is preferred. Another suitable example is $CoFe_2O_4$.

It has been found that the nanoparticle should be sufficiently small for the capture complex to function as a catalyst, therewith degrading the present polymer into smaller units, wherein the yield of these smaller units, and specifically the monomers thereof, is high enough for commercial reasons. It is noted in this respect that a commercial value of (waste) polymers to be degraded is relatively small, i.e. a costs of degrading should be small as well. It has also been found that the nanoparticle should be sufficiently large in order to be able to reuse the present complex by recovering the present capture complex. It is economically unfavourable that the capture complex would be removed with either waste or degradation product obtained. Suitable nanoparticles have an average diameter of 2-500 nm. It is preferred to use nanoparticles comprising iron oxide.

It is noted that the present nanoparticle is not considered to be a support. A prior art support in general relates to much larger entities, typically in the order of mm or larger. It is noted that for the present process a catalyst on a support is considered unsuited, in particular as a yield of degradation products is too low (or likewise time and/or temperature to obtain such a yield are unfavourable). For instance Valkenberg, et al. in "Immobilisation of ionic liquids on solid supports", Green Chemistry, 2002 (4), pp. 88-93, shows ionic liquids attached to solid supports, e.g. a metal oxide, such as $TiO_2$, $SiO_2$, $Al_2O_3$, etc. Valkenberg, in table 3 shows a comparison between an Fe-IL in unsupported status and in supported status. For anisole the conversion drops from 90% to 6.5% (or about 30% for charcoal) and for m-xylene it drops from about 34% to 15% (or about 18% on charcoal). It is found important to further optimize reaction conditions. So a support would typically not be considered for an ionic liquid in view of conversion.

The present catalyst entity comprises at least two moieties. Such has been found to contribute to at least some of the present advantages. A first relates to an aromatic moiety having a positive charge (cation). A second relates to a moiety, typically a salt complex, having a negative charge (anion). Within the description the term "partly" as referring to the catalyst entity indicates that a part of the catalyst entities is charged, hence typically not all of the entities. The negative and positive charge typically balance one and another. It has been found that the positively and negatively charged moieties have a synergistic and enhancing effect on the degradation process of the polymer in terms of conversion and selectivity, especially in view of degrading polyesters and polyethers.

The aromatic moiety preferably comprises a heterocycle, having at least one, preferably at least two nitrogen atoms. The aromatic moiety preferably stabilizes a positive charge. The heterocycle may have 5 or 6 atoms, preferably 5 atoms. Typically the aromatic moiety carries a positive charge. If a nitrogen is present the charge is on the nitrogen. Suitable aromatic heterocycles are pyridimines, imidazoles, piperidines, pyrrolidines, pyridines, pyrazols, oxazols, triazols, thiazols, methimazols, benzotriazols, isoquinols, and viologen-type compounds (having e.g. two coupled pyridine-ring structures. Particularly preferred is an imidazole-structure, which results in an imidazolium ion.

The negatively charged moiety may relate to a salt complex moiety, preferably a metal salt complex moiety having a two- or three-plus charged metal ion, such as $Fe^{3+}$, $Al^{3+}$, $Ca^{2+}$, and $Cu^{2+}$, and negatively charged counter-ions, such as halogenides, e.g. $Cl^-$, $F^-$, and $Br^-$. Alternatively, the negatively charged moiety may be a negatively charged anion, such as a halide.

The present catalyst entity and nanoparticle are combined by a bridging moiety. The bridging moiety is provided for attaching the catalyst entity to the nanoparticle. The attachment typically involves a physical or chemical bonding between a combination of the bridging moiety and the catalyst entity on the one hand and the nanoparticle on the other hand. Particularly, a plurality of bridging moieties is attached or bonded to a surface area of the present nanoparticle. It is noted that it is important to maintain functionality of the catalyst complex. It is not only important to provide suitable bridging moieties (or a combination thereof), but also to fit a number of bridging moieties with respect to a surface area of the present magnetic nanoparticle. In this respect also a size (diameter) of the present nanoparticle is important.

It has been found that especially a weak organic acid, silanol, silyl comprising groups, and silanol, attach well to the nanoparticle. More particularly, therefore, the bridging moiety comprises a functional group for bonding to the oxide of the nanoparticle and a second linking group to the catalyst entity. The functional group is for instance a carboxylic acid, an alcohol, a silicic acid group, or combinations thereof. Other acids such as organic sulphonic acids are not excluded. The linking group comprises for instance an end alkylene chain attached to the aromatic heterocycle moiety, with the alkylene chain typically between C1 and C6, for instance propylene and ethylene.

The bridging moiety is suitably provided as a reactant, in which the linking group is functionalized for chemical reaction with the catalyst entity. For instance, a suitable functionalization of the linking group is the provision as a substituted alkyl halide. Suitable reactants for instance include 3-propylchloride trialkoxysilane, 3-propylbromide-trialkoxysilane, 2-propylchloride-trialkoxysilane, 2-propylbromide-trialkoxysilane. The alkoxy-group is preferably ethoxy, though methoxy or propoxy is not excluded. It is preferred to use trialkoxysilanes, though dialkyldialkoxysilanes and trialkylmonoalkoxysilanes are not excluded. In the latter cases, the alkyl groups are preferably lower alkyl, such as C1-C4 alkyl. At least one of the alkyl groups is then functionalized, for instance with a halide, as specified above.

The said reactant is then reacted with the catalyst entity. Preferably, this reaction generates the positive charge on the aromatic moiety, more particularly on a nitrogen atom in the aromatic moiety. The reaction is for instance reaction of a (substituted) alkyl halide with the nitrogen containing aromatic moiety, resulting in a bond between the nitrogen atom and the alkyl-group. The nitrogen is therewith charged positively, and the halide negatively. The negatively charged halide may thereafter be strengthened by addition of a Lewis acid to form a metal salt complex. One example is the conversion of chloride to $FeCl_4^-$.

For performance of the process in terms of conversion, selectivity, and economical feasibility the above needs to be taken into account; otherwise no effective capturing of additives is obtained, therewith deteriorating. The present bridging moiety provides the above characteristics (in addition to the present nanoparticle). It is noted that up to now no economically viable process for polymer degradation has been provided.

In an example of the present capture complex the bridging moiety (and the catalyst entity bonded thereto) is provided in an amount of (mole bridging moiety/gr magnetic particle) $5*10^{-10}$-0.1, preferably $1*10^{-7}$-0.01, more preferably $2*10^{-5}$-$10^{-3}$, such as $4*10^{-5}$-$10^{-4}$. It is preferred to have a relatively large amount available in terms of e.g. effective capturing, whereas in terms of amount of catalyst and costs thereof a somewhat smaller amount is available, especially as the magnetic nanoparticles are considered as a relatively cheap part of the capture complex. Surprisingly the present method can be performed with very low amounts of capture complex, compared to prior art methods.

In an example of the present capture complex the nanoparticles have an average diameter of 2 nm-500 nm, preferably from 3 nm-100 nm, more preferably from 4 nm-50 nm, such as from 5-10 nm. As indicated above, the particles are preferably not too large and not too small. It has been found that e.g. in terms of use and recovery of capture complex a rather small size of particles of 5-10 nm is optimal. It is noted that the term "size" relates to an average diameter of particles, wherein an actual diameter of a particle may vary somewhat due to characteristics thereof. In addition the size is determined per individual particle. For an average a number weight average may be taken. In an approximation the average may be taken as the size with the highest number of particles or as a median size.

In an alternative embodiment, the nanoparticles may have sizes in a range of 50-200 nm, such as 80-150 nm, e.g. 100 nm. In this embodiment, the nanoparticles are present in the form of aggregates which may be formed e.g. in the solution. These aggregates typically have sizes in a range of 50-200 nm, such as 80-150 nm, e.g. 100 nm. Particle sizes and a distribution thereof can be measured e.g. by light scattering, e.g. using a Malvern Dynamic light Scattering apparatus, such as a NS500 series. In a more laborious way, typically applied for smaller particle sizes and equally well applicable to large sizes representative EM-pictures are taken and the sizes of individual particles are measured on the picture.

In case of degradation the solid polymer is provided in a suitable solvent. As such the method may be considered as a solid-liquid degradation process supported by addition of a recoverable capture complex. For instance, alcohols may be used. Preferred alcohols are aliphatic, for instance alkanols and alkanediols. Mixtures of alcohols and/or mixtures of water and alcohols are also deemed feasible. For a glycolysis the solvent is preferably a mono- or di-alcohol, such as an alkanol or alkanediol. As such the solvent also functions as a reactant in the polymer degradation.

The method may be carried out batch-wise, continuous, semi-continuous, and combinations thereof.

Various details of the degradation method may be found in the International Applications PCT/NL2014/050418, and WO 2014/142661 A2, filed by the same applicant, which contents are incorporated by reference.

Suitably, the polymer to be degraded is a condensation polymer, for instance chosen from polyesters, polyethers, polycarbonates, polyimides and polyamides. Representative examples include PET (polyethyleneterephtalate), PEF (polyethylenefuranoate), PTT (polytrimethyleneterephthalate, PLA (polylactic acid).

It is an advantage of the present method that the method is relatively insensitive to contaminants, like additives, such as pigments, fillers, and filters, are separated in the course of the degradation process. It is understood by the inventors, that the additives adhere to the capture complex. Particularly, the bridging moieties and catalyst entities jointly adhered to the nanoparticles appear to enable adsorption of hydrophobic colorants. After the degradation process, the capture complex may be regenerated, in that the additives are removed by washing. It was found in preliminary investigations that degradation treatments of several (5-20) batches of polyester bottles may be carried out before a washing step is needed. As such the present method is considered robust, to be used under relatively sub-optimal conditions, such as in a plant.

Compared to prior art methods a characteristic of the present method is that the capture complex can be recovered. It is preferred to use the present capture complex in the present method. In one embodiment, the recovery comprises the steps of providing a second solvent, e.g. functioning as washing agent, and separating the capture complex from any additives and/or the—first—solvent, for instance using an electromagnetic field. Such separation and recovery is particularly desired in order to separate the additives from the capture complex. Therewith the capture complex can be reused. In a further embodiment, the capture complex is re-used in the process without recovery. Rather the recovery occurs only after a plurality of degradation stages.

Thereby the present invention provides a solution to at least one of the above mentioned problems. The various examples and embodiments of the present invention may be combined.

Advantages of the present description are detailed throughout the description.

DETAILED DESCRIPTION OF THE INVENTION

The present invention relates in a first aspect to a capture complex and use thereof according to claim 1.

In an example of the present capture complex the nanoparticles are at least one of ferromagnetic particles, antiferromagnetic particles, ferrimagnetic particles, synthetic magnetic particles, paramagnetic particles, superparamagnetic particles, such as particles comprising at least one of Fe, Co, Ni, Gd, Dy, Mn, Nd, Sm, and preferably at least one of O, B, C, N, such as iron oxide, such as ferrite, such as magnetite, hematite, and maghemite. In view of capturing capability magnetite and maghemite are preferred magnetic particles. In view of costs, even when fully or largely recovering the present capture complex, relatively cheap particles are preferred, such as particles comprising Fe. In addition non-magnetic nanoparticles could be used, typically oxide comprising particles, such as $Al_2O_3$, CaO, and clays, such as T-O-T clays and T-O clays. Preferably, the nanoparticles are selected so as to be substantially insoluble in the (alcoholic) solvents, also at higher temperatures of more than 100° C. One oxide that tends to dissolve at higher temperatures in an alcohol such as glycol, is for instance (amorphous) $SiO_2$. It is noted that some sophisticated tailoring may be required.

In an example of the present capture complex the bridging moiety comprises a functional group for adhesion or bonding to the nanoparticle and a linking group towards the catalyst entity, and particularly the hetero atom of the aromatic moiety. Suitable functional groups are for instance weak organic acid (such as a carboxylic acid or a dicarboxylic acid) and silanols, including silanediols and silanetriols. The linking group is for instance an alkyl, such as ethyl, propyl, butyl, pentyl, and hexyl. When forming the present complex he bridging moiety may be introduced as a reactant in the form of a silyl comprising group, such as silylethers, such as triethoxysilylpropylhalide (such as triethoxysilylpropyl-3-chloride. For a weak organic acid the Ka typically varies between $1.8 \times 10^{-16}$ and 55.5. It has been found that despite negative expectations these bridging groups do not result in a non-acceptable reduced performance, such as a decreasing catalytic performance of the catalyst entity.

In an example of the present capture complex the aromatic moiety has at least one tail. The present tail relates to a tail like moiety. The at least one tail preferably having a length of $C_1$-$C_6$, such as $C_2$-$C_4$, the at least one tail being attached to the at least one nitrogen atom. It has been found that for an optimal degradation of a polymer a somewhat higher yield is obtained when the present tail is somewhat longer. In terms of mass of capture complex provided it has been found that a somewhat shorter tail is preferred, and also in view of capturing additives too long tails limit capturing.

In an example of the present capture complex the magnetic nanoparticle comprises (per particle) at least one bridging moiety and catalyst entity, preferably $2\text{-}10^4$ bridging moieties and catalyst entities (BC per particle), more preferably $10\text{-}10^3$ bridging moieties and catalyst entities (BC per particle). In principle as many catalyst entities as possible may be provided. However the amount of catalyst entities and there functioning is somewhat smaller than an amount that could be achieved. Also when a larger particle is selected somewhat more catalyst entities may be present.

In an example of the present capture complex the amount of bridging moiety and catalyst (entity) attached thereto is 0.03-99 wt. %, preferably 0.1-75 wt. %, more preferably 0.2-25 wt. %, even more preferably 0.3-10 wt. %, relative to a total weight of capture complex. Likewise as above, a relative low amount of 0.1-5 wt. % of catalyst entity has been found to be optimal, such as 0.6-3 wt. %, within further boundary conditions such as applied temperature. An amount of catalyst and/or bridging moiety may be determined by TGA. It is noted that the present catalyst and bridging moiety may form a single (mono-) layer, or a part thereof not fully covering the nanoparticle. Before applying the present capture complex in the present method it may be washed. The above weight percentages are relative to a total weight of (dry) capture complex.

In a second aspect the present invention relates to a method according to claim 7. Therein an additive is provided, typically being released from a polymer upon degradation thereof. It has been found that the present method and capture complex are also suited in methods wherein natural polymers are degraded. The additive is preferably captured under addition of an excess (in terms of capability of capturing) present capture complex. The excess is determined on a molar basis. The additive is typically hydrophobic of nature.

In an example of the present method the additive and complex are present in a hydrophilic solution, such as ethylene glycol and water. The method may further comprise the steps of precipitating the complex and additive, such as by decreasing a temperature; removing the hydrophilic solution, such as by decanting; adding a washing agent, such as $CH_2Cl_2$; dissolving the additive in the washing agent, and recovering the complex. As an alternative to precipitation the capture complex may be filtered. With this relative simple method most or virtually all of the additive can be captured and released from the capture complex.

In an example, relating to pigments in depolymerized PET (monomer/BHET), no remaining pigment could be detected, such as by $^1H$ NMR.

In an example the present method further comprises the step of adding a hydrophilic solution when adding the washing agent, i.e. an organic solvent that is preferably a hydrophobic solvent. Therewith a two-phase system is created. As such the hydrophobic additive is separated from e.g. a reaction product.

In an example of the present method a polymer provides the additive upon degradation, wherein the polymer is a mixture of waste polymers, the mixture optionally comprising at least one of coloured polymers. With the present method most additives can be captured, and in particular colorants. The capturing process is very effective as no remaining additives could be detected e.g. visually; for instance a fully clear (not coloured) solution or monomer/dimer product was obtained. Using UV-Vis absorption of specific wavelength disappeared largely.

So the present method is capable of handling waste polymers, and even further a mixture of polymers, e.g. having different characteristics, such as a different colour. The yield of degradation and capturing efficiency has been found not to be influenced noticeably. In a further step an active compound, such as carbon black, may be added to capture and remove remaining additives.

It is noted that prior art methods at the most can only handle relatively pure waste polymer, and even then results are discouraging.

In an example of the present method the polymer may selected from natural polymers, biobased polymers, biodegradable polymers, polymers formed (directly or indirectly) from fossil fuels, and combinations thereof. In an example the polymer is at least one of a polyester, a polyether, such as poly-oxymethylene (POM), polyethylene glycol (PEG), polypropylene glycol (PPG), polytetramethyleneglycol (PTMG), polyethylene oxide (POE), polypropylene oxide (PPO), polytetrahydrofuran (PTHF), and polytetramethyleneetherglycol (PTMEG), a polypeptide, a polyamide, a polyamine, a polycondensate, preferably a polyester, such as poly carboxylic ester, wherein the poly carboxylic ester is preferably selected from polyethylene terephthalate (PET), polyethylene furanoate (PEF), polybutylene terephthalate (PBT), polytrimethylene terephthalate (PTT), polyglycolic acid (PGA), polylactic acid (PLA), polycaprolactone (PCL), polyethylene adipate (PEA), polyhydroxyalkanoate (PHA), polyhydroxybutyrate (PHB), polyethylene naphthalate (PEN), Poly(3-hydroxybutyrate-co-3-hydroxyvalerate) (PHBV), and a polycondensate of 4-hydroxybenzoic acid and 6-hydroxynaphthalene-2-carboxylic acid (VECTRAN). In other words a large variety of polymers may be degraded by the present method. Some adjustments may be necessary, e.g. in terms of catalyst used, temperature applied, solvent used, etc. The present method is best suited for degradation using hydrolysis or glycolysis, such as in degradation of polyesters and polyethers, in particular PET and PEF.

After degradation the obtained mixture may be cooled down, e.g. to 50-85° C. At this temperature a magnetic separation may be performed. Likewise alternative separation techniques, such as filtering, centrifugation, etc. may be used. Thereafter a mixture may be cooled down even further, e.g. to 1-10° C., in order to precipitate e.g. a monomer or dimer. The obtained precipitate may further be dried, e.g. at 50-75° C.

In an example of the present method the amount of catalyst complex is 0.1-35 wt. %, preferably 0.5-20 wt. %, more preferably 1-10 wt. %, even more preferably 2-7 wt. %, relative to a total weight of polymer provided, such as (weight to weight) 1 ABC:15PET (:45 EG, ethylene glycol). If the amount of catalyst is higher a shorter reaction time was obtained, whereas at a lower amount longer reaction times were obtained. Depending on further boundary conditions one may vary the amount of catalyst.

In an example of the present method the additive has an average size of 1-100 nm, and a molecular weight of 10-5000 Dalton. In particular the following additives can be captured. Organic based pigments, such as acridine dyes, anthraquinone dyes, arylmethane dyes, diarylmethane dyes, triarylmethane dyes, azo-dyes, diazonium dyes, nitro dyes, nitroso dyes, phthalocyanine dyes, quinone-imine dyes, azin dyes, eurhodin dyes, safranin dyes, indamins, indophenol dyes, oxazin dyes, oxazone dyes, thiazine dyes, thiazole dyes, xanthene dyes, fluorene dyes, pyronin dyes, fluorone dyes, rhodamine dyes, and derivatives thereof, biological pigments, such as alizarin, alizarin crimson, gamboge, cochineal red, rose madder, indigo, Indian yellow, and Tyrian purple, and non-biological organic pigments, such as quinacridone, magenta, phthalo green, phthalo blue, pigment red 170, diarylide yellow, metal-based pigments, such as cadmium pigments, chromium pigments, cobalt pigments, copper pigments, iron oxide pigments, lead pigments, manganese pigments, mercury pigments, titanium pigments, and zinc pigments, and further inorganic pigments, such as carbon pigments, clay earth pigments, and ultramarine pigments, and salts thereof, and combinations thereof. The capture efficiency may vary, depending on the nature of e.g. the pigment, from 25% to >99.99%. In addition freed additives may be captured by other compounds, such as carbon black.

In an example of the present method further comprises the step of recovering the catalyst attached to the magnetic particle using an electro-magnetic field gradient, preferably in a magnetic field of 0.1-5 T, preferably from 0.3-2 T, more preferably from 0.5-1.5 T, such as 0.8-1.3 T, e.g. 1 T. As such a relatively small magnetic field is found to be sufficient to recover the present capture complex. In view of e.g. reactor design such is advantageous. In an example water is provided, in order to separate the present complex from the present solvent. It has been found that it is much easier to remove the present complex from a water phase, than from the present solvent phase. By providing a suited capture complex, such as the present complex, the catalyst (complex) may be recovered. It has been found that typically 95% of the capture complex can be recovered, and often even 98-99%. As a consequence the present capture complex can be reused 20-100 times, thereby e.g. saving costs. It has been found that a recovered capture complex functions equally well compared to a fresh (non-used) complex.

In an example of the present method further comprises the step of recycling the capture complex. After recovery the present complex can be recycled or removed and e.g. stored for later use.

In an example of the present method the polymer is polyethylene terephthalate (PET) or PEF, the solvent is ethanediol, the catalyst comprises butylimidazole or butylmethylimidazole and $FeCl_4^-$, the bridging moiety is triethoxysilylpropyl or trihydroxysilylpropyl, and the nanoparticle is magnetite and/or maghemite. The nanoparticles preferably have a size of 5-10 nm. The bridging moiety preferably is present in an amount of $10^{-4}$-$10^2$ mole bridging moiety/gr nanoparticle, such as $2*10^{-4}$-$10^{-3}$. It is assumed that if a predetermined amount (moles) of bridging moiety is attached to a predetermined amount (gr) practically all of the bridging moieties attach to the nanoparticle and substantially stay attached during the present method. Such is especially a preferred embodiment in view of the abundant amount of waste PET being available, being in excess of hundreds of thousand tons per year.

The present capture complex may for instance be used in a ratio (weight to weight) of Complex:PET in a range of 1:5 to 1:500, such as 1:10-1:15. In addition the amount of e.g. ethylene glycol:PET may vary from 1:2 to 1:20, such as 1:3 to 1:5. The waste polymers may relate to a single type of polymer, such as PET, PEF, PA, etc., and also to a mixture thereof. It typically comprises 50-99.9 wt. % of a specific polymer, such as PET, the remainder being impurities, other polymers, other compounds, etc.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

SUMMARY OF FIGURES

FIG. 1a-e shows chemical reactions and capture complexes.

DETAILED DESCRIPTION OF FIGURES

FIG. 1a shows chemical reactions. Therein poly(ethylene terephthalate) is degraded in 1,2-ethanediol. Similar results have been obtained with the capture complex of the present invention; in an example bim is used as aromatic catalyst entity. As a result Terephthalic Acid Bis(2-Hydroxyethyl) ester (BHET) is formed. Further, it is shown that BHET can be converted into dimers and oligomers (typically having 3-12 monomers).

FIG. 1b shows a schematic representation of the present capture complex. Therein A represents a nanoparticle, such as maghemite, B a bridging moiety directly attached to the nanoparticle, such as trisilanolpropyl, and C a catalyst entity, directly attached to the bridging moiety, with C1 being a positive catalyst moiety, such as bim, and C2 being a negative catalyst moiety, such as $Cl^-$. If present (hence not shown) a tail would extent away from the nanoparticle.

FIG. 1c shows a nanoparticle A surrounded by a number of bridging moieties and catalyst entities and attached to the nanoparticle.

Figure 1D:
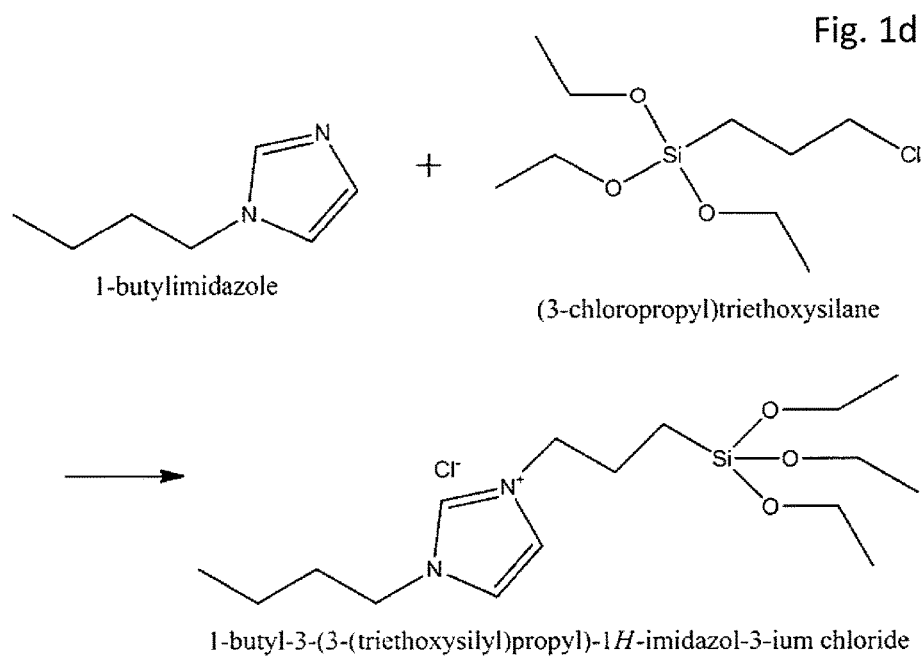

FIG. 1d shows an example of making one embodiment of the capture complex of the invention. In a first step 3-chloropropyltriethoxysilane is reacted over night with 1-butyl-imidazole under heating forming a BC sub-complex; herein the butyl forms a tail. A temperature is from 320-360° K, and depending on the temperature a reaction time is from 30-360 minutes. The reaction yields almost 100% BC sub-complex. The BC sub-complex is thereafter grafted on an iron oxide comprising nanoparticle. In this example, due to the presence of the carboxylic acid group, the grafted is understood to result in adhesion. Alternatively, in the presence of a silanol group, the grafting may be in the form of chemical bonding.

Figure 1E:
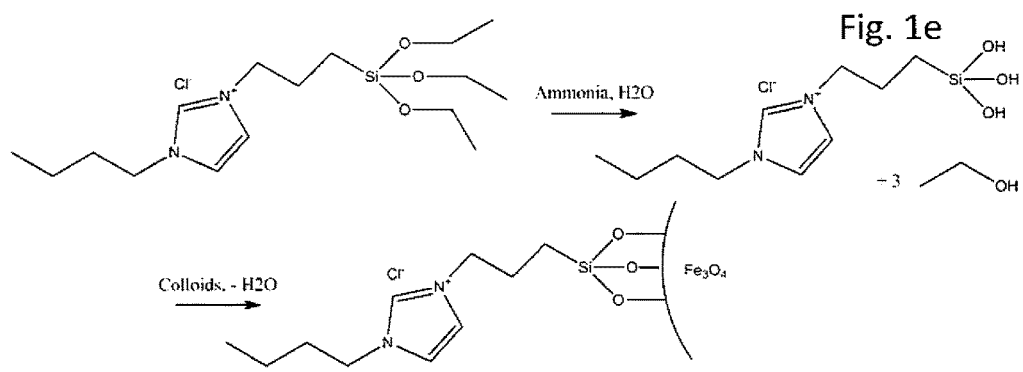

FIGS. 1d and 1e show reaction equations for formation of the capture complex of the invention in accordance with one preferred embodiment. In a first step (FIG. 1d) 3-chloropyltriethoxysilane is reacted over night with 1-butyl-imidazole under heating forming a BC sub-complex; herein the butyl may be referred to as a tail. A temperature is from 320-470 K, and depending on the temperature a reaction time is from 30 min. to overnight. The reaction yields almost 100% BC sub-complex. The resulting intermediate is the combination of positively charged N-[3-(triethoxysilyl)propyl]-butylimidazolium and negatively charged chloride. Subsequently, a Lewis acid, such as $FeCl_3$ may be added. However, that is not deemed necessary. In a second step, shown in FIG. 1e, the ethoxy-groups of the said reaction product thereof are converted to hydroxyl-groups, to result in a silanol-group. In a third step, that is for instance carried out in water or in ethanol or aqueous ethanol, the silanol is reacted with the nanoparticle surface, preferably in the presence of an acid. The resulting capture complex may thereafter be (re)dispersed in the desired solvent for the polymer degradation, for instance glycol.

EXAMPLES

Tests have been performed on coloured PET and previously for non-coloured PET. The results thereof are in the same order of magnitude for both conversion and selectivity towards BHET. As a consequence inventors conclude that a colour additive has hardly any or no impact in this respect. Even further, additives, such as pigments, can be removed from the degradation products, with ease.

Similar tests as above have been performed on a wide range of raw (PET) material, e.g. polyester clothing, PET carpet, PET material from automotive industry, recycled PET, multi-layered PET trays containing other polymers, such as PE and PP. The results thereof are in the same order of magnitude. As a consequence inventors conclude that the process is highly insensitive to different raw (PET) material and robust as well.

In an example inventors used 1 g of capture complex of FIG. 1e and 5 g of PET. Experiments showed that all colorants were removed by the complex, that is no colour was detectable in the obtained BHET/ethylene glycol (EG)/water phase.

It has been found that the present complex is capable of removing at least 2.5 mg colorant/g complex in one single use; examples show a removal of 25 mg colorant/g complex in a single run. When used in sequence of e.g. five times it has been found that the complex removes at least 12.5 mg colorant/g complex. When used for a large number of sequences (e.g. up to 50 times) there is been found no drawback in efficiency; hence the complex is considered to be capable of removing at least 125 mg/g complex. Such a capability is considered enough for most applications considered.

In one preferred embodiment, a washing step is performed in order to remove the captured compound. Advantageously, this washing needs only to be done after a series of runs or cycles If an amount of additive is large relative to the amount of capture complex the capture complex may be washed; typically the capacity for capturing additives by the complex, as indicated above is relatively large and the complex only needs to be washed after 5-10 cycles.

Further Examples

Examples Found of Degradable Polymers:
Polyesters: PET, PEF, PTT, PLA, polycarbonate
Polyethers: cellulosis
Polyamides: nylon 6
Ionic Liquids Tested:

An imidazolium based functional acid a piperidinium based functional acid, a pyridinium based functional acid, a pyrrolidinium based functional acid, a sulfonium based functional acid with an additional side group R3, an ammonium based functional acid with additional side groups R3 and R4, and a phosphonium based functional acid with additional side groups R3 and R4; all with at least side groups R1 and R2 and counter ion X—. X may be selected from F, Cl, Br, I, dicyanamide, bis(trifluoromethylsulphonyl)imide, preferably Cl.

The functional group R1 may be a (mono or multi, 1-4) carboxylic acid, whereas functional group R2 may be an alkane, typically a straight or branched alkane. Functional groups R3 and R4 may be selected from H, $CH_3$ and R1 and R2. Functional groups R1-R4 have been selected independently and may be (partly) the same, or not. The side group R2 may have m or o carbon atoms may be branched, whereas the side group R1 having n (typically 4-20) carbon atoms is preferably unbranched.

So in summary aromatic and non-aromatic moieties had and have been tested, typically comprising a heteroatom (N, S, P), having a positive charge on the (or one of) hetero atom(s), and various side groups have been tested. The most promising have been claimed, namely the aromatic ones with a nitrogen atom.

Metal Salts:
Various metal salt comprising two- or three-plus charged metal ion and negatively charged counter-ions have been tested, especially Fe, Ca, Co, Mn, and the above counter ions.

Bridging Moiety:
For the bridging moiety weak and functionalize acids have been tested, such as a carboxylic acids and an oxysilane, such as methoxysilane or ethoxysilane.

Nanoparticles:
Various nanoparticles have been tested such as having O as counter ion, and Fe, Co and Mn as metal ion, and some combinations thereof. These function fine.

A size is typically relatively small, hence nanoparticles, with a lower value of 2 nm, and an upper value of 500 nm. Both have certain minor advantages and disadvantages.

Recovering Catalyst:
Most or all of the catalyst can be recovered easily, depending on the method of recovery. After 30 times recovery the amount recovered using magnetic recovery is higher than 98% of the initial amount, so virtually no losses. If filtration is used even higher amounts can be recovered.

Example 2

Depolymerisation Method

The reference scale of a laboratory experiment is 50 g of ethylene glycol (EG) in a 100 mL flask. The reference mass ratio of the reaction is 1 g of dry catalyst complex particles: 5 g of PET: 50 g of EG. The reference capture complex comprises 5 nm magnetite nanoparticles, trisilanolpropyl as bridging moiety and as ionic liquid (bim)$FeCl_4$ or (bmim)$FeCl_4$). A reference reaction was executed as follows:

The catalyst complex dispersion was homogenised by shaking for 5 minutes by hand. To 10 g of capture complex dispersion 41 g of EG was added and the liquids were shortly mixed by hand to homogenise the dispersion. Then, 5 g of PET flakes were added and the round bottom flask was placed in the heating set up. The PET flakes were prepared from colored PET bottles commercially available from SPA®, as SPA® Reine (Blue in blue colored PET bottles) and SPA® Sparkling (Red in red colored PET bottles). The heating was started and after 20 minutes, the reaction mixture had reached the reaction temperature of 150-200° C. The reaction was followed in time by taking in-process-control samples to measure the concentration of BHET produced as a function of time. The concentration of BHET was determined with HPLC. The results are listed in Table 1. It was found that the reaction conditions (temperature, concentration of capture complex, type and size of nanoparticle) could be varied in sufficient broad ranges.

TABLE 1

Conversion of PET to BHET as a function of time for a reference PET depolymerisation reaction

| Time [min] | PET to BHET conversion [%] |
|---|---|
| 5 | 1.7 |
| 10 | 5.4 |
| 15 | 10.0 |
| 20 | 10.5 |
| 35 | 31.8 |
| 45 | 51.5 |
| 60 | 92.4 |

Example 3

After the depolymerisation reaction, water was added in a 1:1 ratio and the capture complex was separated from the liquid stream containing the monomer by magnetic separation. The liquid phase was decanted, leaving the capture complex as a slurry-like layer on the bottom of the beaker. The capture complex could be easily redispersed with ethylene glycol. To release the colorants from the capture complex, an organic solvent, in this example CH2Cl2 was added and stirred vigorously. The capture complex was magnetically sedimented leaving a clear red or blue supernatant, dependent on the type of bottle used for the flakes. The supernatant could be decanted and the capture complex could be redispersed in ethylene glycol again.

Example 4

Examples 2 and 3 were repeated using a white PET bottles, that contained white-colored pigment, apparently $TiO_2$. However, when the magnetic sedimentation was performed in the presence of the organic solvent to release the pigment, the liquid phase was left with the sedimented capture complex. This was left to stand overnight and a white layer of pigment particles had sedimented overnight on top of the capture complex sediment.

Example 5

Preparation of a Catalyst Capture Complex

Preparation of the Linker-Catalyst Complex (Bridge-Catalyst)

An alkyl imidazole is mixed with a halogensilane in a 1:1 molar ratio and stirred at a slightly elevated temperatures for 8 hours.
Preparation of the Catalyst Complex The nanoparticles are prepared based on the method first described by Massart et al. in 1981:

An Fe(II) solution is mixed with a Fe(III) solution in a 1:2 molar ratio respectively. The iron oxide nanoparticles are formed by a co-precipitation reaction in basic medium while stirring. Subsequently, the resulting iron oxide particles are washed water and ethanol.

Next, an adequate amount of linker-catalyst complex diluted with ethanol is mixed well with the dispersion of iron oxide particles, after which ammonia added. The reaction mixture is stirred for 15 hours. Depending on a ratio between linker-catalyst and nanoparticle an amount of linker-catalyst per nanoparticle may vary.

The particles are washed with acetone prior to redispersion in ethylene glycol.

The invention although described in detailed explanatory context may be best understood in conjunction with the accompanying examples and figures.
It should be appreciated that for commercial application it may be preferable to use at least one variations of the present system, which would similar be to the ones disclosed in the present application and are within the spirit of the invention.

The invention claimed is:

1. A method of capturing an additive releasable from a polymer material, wherein the polymer material is one or more of a polyester, a polyamide, a polyamine, a polycondensate, and a polyether, comprising the steps of:
providing the a polymer material including an additive that is releasable upon degradation of said polymer material;
providing an improved capture complex not being dispersible in water and comprising a catalyst entity, a magnetic nanoparticle, and a bridging moiety solely between the catalyst entity and the magnetic nanoparticle, wherein the catalyst entity and bridging moiety are attached by a chemical covalent bond and wherein the bridging moiety and nanoparticle are attached by a covalent bond, wherein the catalyst entity comprises an aromatic heterocyclic moiety carrying a positive charge, and a negatively charged moiety, wherein the negative charge is on a metal salt complex moiety having a two- or three-plus charged metal ion or a negatively charged counter-ion, wherein the nanoparticles have an average diameter of 2 nm-500 nm, and wherein the bridging moiety is present in an amount of $5*10^{-10}$-0.1 Mole bridging moiety/gr nanoparticle,
wherein said polymer material in solid form and said improved capture complex are provided in a solvent; and
capturing the released additive under addition of an excess of the improved capture complex.

2. The method according to claim 1, wherein the additive and complex are present in a hydrophilic solution, further comprising the steps of:
precipitating the complex and additive,
removing the hydrophilic solution,
adding a washing agent,
dissolving the additive in the washing agent, and
recovering the complex.

3. The method according to claim 1, wherein the washing agent comprises a hydrophobic solvent.

4. The method according to claim 1, wherein the polymer is a mixture of waste polymers.

5. The method according to claim 4, wherein the polymer is a polyester.

6. The method according to claim 1, wherein the additive has an average size of 1-100 nm, and a molecular weight of 10-5000 Dalton.

7. The method according to claim 1, wherein the polymer material is polyethylene terephthalate (PET) or polyethylene furanoate (PEF), the solvent is ethanediol, the catalyst entity comprises imidazolium, and $FeCl_4^-$ or $Cl^-$ the bridging moiety is triethoxysilylpropyl or trihydroxysilylpropyl, and the nanoparticle is at least one of magnetite, hematite, and maghemite.

8. The method according to claim 1, wherein the capture complex is washed after 5-10 cycles.

9. The method according to claim 1, wherein at least one additive is an organic pigment.

10. The method according to claim 1, wherein at least one additive is a metal-based pigment.

11. The method according to claim 10, wherein the additive is a $TiO_2$ pigment.

12. The method according to claim 5, wherein the polyester is a waste material from polyester bottles.

13. The method according to claim 1, wherein the bridging moiety is one or more of a weak organic acid, silyl comprising groups, and silanol.

14. The method according to claim 1, wherein the aromatic heterocyclic moiety has at least one nitrogen atom to which a linking group of the bridging moiety is bonded.

15. A method of capturing an additive releasable from a polymer material, wherein the polymer material is one or more of a polyester, a polyamide, a polyamine, a polycondensate, and a polyether, comprising the steps of:
providing the polymer material including an additive that is releasable upon degradation of said polymer material;
providing an improved capture complex not being dispersible in water and comprising a catalyst entity, a magnetic nanoparticle, and a bridging moiety solely between the catalyst entity and the magnetic nanoparticle, wherein the catalyst entity and bridging moiety are attached by a chemical covalent bond and wherein the bridging moiety and nanoparticle are attached by physical or chemical bonding, wherein the catalyst entity comprises an aromatic heterocycle moiety carrying a positive charge, and a negatively charged moiety, wherein the negative charge is on a metal salt complex moiety having a two- or three-plus charged metal ion or a negatively charged counter-ion, wherein the nanoparticles have an average diameter of 2 nm-500 nm, and wherein the bridging moiety is present in an amount of $5*10^{-10}$ –0.1 Mole bridging moiety/gr nanoparticle; and capturing the released additive under addition of an excess of the improved capture complex.

16. The method according to claim 15, wherein the additive and complex are present in a hydrophilic solution, and further comprising the steps of:
precipitating the complex and additive,
removing the hydrophilic solution,
adding a washing agent,
dissolving the additive in the washing agent, and
recovering the complex.

17. A method of capturing an additive releasable from a polymer material, wherein the polymer material is one or more of a polyester, a polyamide, a polyamine, a polycondensate, and a polyether, comprising the steps of:
providing the polymer material including an additive that is releasable upon degradation of said polymer material;
providing an improved capture complex not being dispersible in water and comprising a catalyst entity, a magnetic nanoparticle, and a bridging moiety solely between the catalyst entity and the magnetic nanoparticle, wherein the catalyst entity comprises an aromatic heterocyclic moiety carrying a positive charge, and a negatively charged moiety, wherein the negative charge is on a metal salt complex moiety having a two- or three-plus charged metal ion or a negatively charged counter-ion, wherein the catalyst entity and bridging moiety are attached by a chemical covalent bond, obtained by chemical reaction of a functionalized linking group of the bridging moiety and the aromatic heterocyclic moiety, wherein the combination of the bridging moiety and the catalyst entity are attached to the nanoparticle by physical or chemical bonding, wherein the nanoparticles have an average diameter of 2 nm-500 nm, and wherein the bridging moiety is present in an amount of $5*10^{-10}$ –0.1 Mole bridging moiety/gr nanoparticle; and capturing the released additive under addition of an excess of the improved capture complex.

18. The method according to claim 17, wherein the additive and complex are present in a hydrophilic solution, and further comprising the steps of:
precipitating the complex and additive,
removing the hydrophilic solution,
adding a washing agent,
dissolving the additive in the washing agent, and
recovering the complex.

* * * * *